J. H. BRADY.
SANITARY DRINKING FOUNTAIN.
APPLICATION FILED NOV. 28, 1910.
1,034,411.
Patented Aug. 6, 1912.
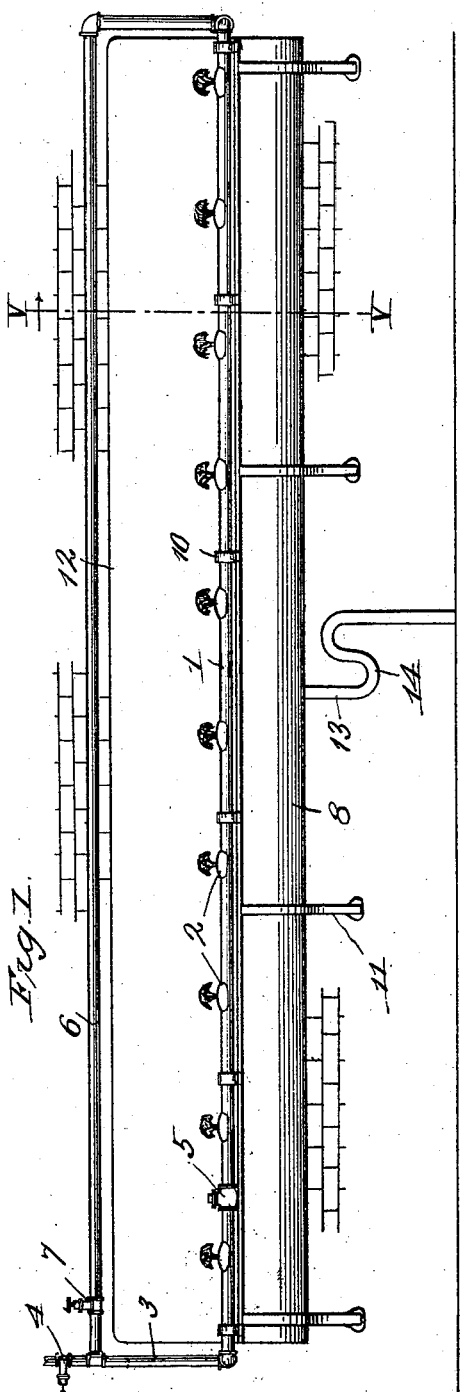
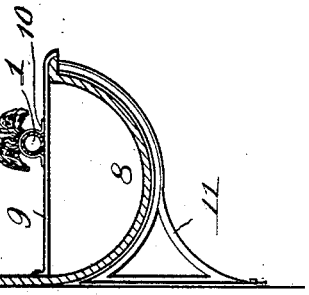
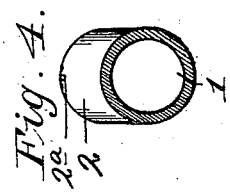
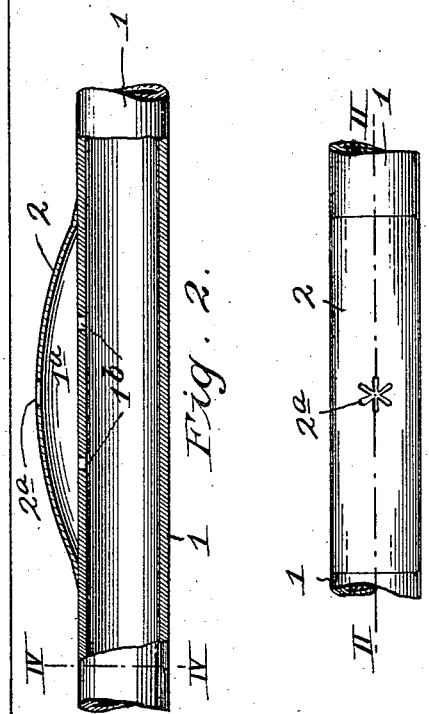
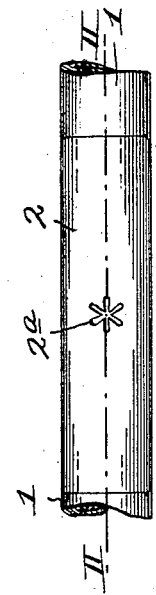
Witnesses:
Inventor:
Joseph H. Brady,

UNITED STATES PATENT OFFICE.

JOSEPH H. BRADY, OF KANSAS CITY, MISSOURI.

SANITARY DRINKING-FOUNTAIN.

1,034,411.  Specification of Letters Patent.  Patented Aug. 6, 1912.

Application filed November 28, 1910. Serial No. 594,477.

*To all whom it may concern:*

Be it known that I, JOSEPH H. BRADY, a citizen of the United States, residing at Kansas City, in the county of Jackson and State of Missouri, have invented certain new and useful Improvements in Sanitary Drinking-Fountains, of which the following is a specification.

My invention relates to improvements in sanitary drinking fountains, and is designed more particularly for use in school buildings and other public places.

The invention embodies a mouth-piece, free from edges or corners apt to collect germs or to injure the mouth of a child drinking therefrom; a reservoir to supply said mouth-piece with a steady stream of water which overflows and cleanses said mouth-piece, keeping it in a sanitary condition, and a source of supply for said reservoir.

In order that the invention may be fully understood, reference will now be made to the accompanying drawing in which:

Figure 1 shows an elevation of my improved fountain. Fig. 2 is a vertical horizontal section through the supply pipe and one of the mouth-pieces, on line II—II of Fig. 3. Fig. 3 is a broken plan view of the supply-pipe, provided with a mouth-piece. Fig. 4 is a transverse section on line IV—IV of Fig. 2. Fig. 5 is a transverse section on line V—V of Fig. 1.

The drawing shows my improved fountain arranged more particularly for use in school buildings.

Referring in detail to said drawing: 1 designates a supply-pipe provided, in the present instance, with a plurality of mouth-pieces 2, soldered or otherwise fixed directly to the upper portion thereof. Said mouth-pieces are convex and form between them and the supply-pipe 1, reservoirs 1ª, fed through outlets 1ᵇ in said pipe, and discharging through openings 2ª in the mouth-pieces.

3 designates a feed pipe communicating with one end of supply-pipe 1, and provided with a valve 4.

5 designates a valve interposed between two of the mouth-pieces, near one end of supply-pipe 1. 6 designates a branch-pipe leading from feed-pipe 3 to the opposite end of pipe 1, and provided with a valve 7, to control the flow of water therethrough. By supplying pipe 1 from both ends through pipes 3 and 6, a substantially uniform discharge of water from the mouth-pieces 2 is obtained.

8 designates a spout arranged beneath supply-pipe 1, which is supported upon a plurality of straps 9, extending transversely across spout 8, and provided with clips 10, whereby supply-pipe 1, is firmly secured in position. Spout 8 is preferably supported against an adjacent wall by a plurality of brackets 11, and has an upward extension 12, which acts as a splash-board for the protection of said wall.

13 designates a drain-pipe leading from spout 8 and having a trap 14 to prevent escape of sewer gas into the spout when the drain-pipe 13 is connected to a sewer.

In practice all of the reservoirs are supplied with water by opening valves 4 and 7. As the water discharges through the outlets of the mouth-pieces, it spreads over the surface of the same and thereby keeps said mouth-pieces free from all foreign matter. The overflow from the mouth-pieces, is collected by spout 8 and conducted thereby to drain-pipe 13, through which it escapes. When it is desired to supply but one reservoir with water, valves 5 and 7 are closed.

The mouth pieces, being convex, as shown and described, exterior recesses for the lodgment of germs is avoided, and a reservoir is formed under each mouth-piece to supply the same with a steady stream of water, even though the pressure in supply-pipe 1 fluctuates more or less.

Having thus described my invention what I claim, and desire to secure by Letters Patent is:

1. A fountain of the character described, consisting of a supply-pipe having an outlet therein, and a convex mouth-piece permanently fixed directly on said supply-pipe over the outlet therein forming a reservoir between it and said supply-pipe, said mouth-piece having a discharge opening.

2. A fountain of the character described consisting of a supply-pipe having outlets therein, convex mouth-pieces permanently fixed directly on said supply-pipe over the outlets therein, forming reservoirs, said mouth-pieces having discharge openings therein, and a spout to carry off the overflow from said mouth-pieces.

3. A fountain of the character described, consisting of a supply-pipe having outlets therein, convex mouth-pieces on said supply-pipe over the outlets therein, forming reservoirs, said mouth-pieces having discharge openings therein, a spout to collect the overflow from said mouth-pieces, a valve between two of the said mouth-pieces, a feed-pipe communicating with the supply-pipe, a branch-pipe communicating with said feed-pipe and the supply-pipe, and a discharge-pipe leading from the bottom of the spout and provided with a trap, for the purpose described.

4. A fountain of the character described, consisting of a spout having a splash-board, straps extending transversely across said spout, a supply-pipe supported by said straps, and provided with outlets, mouth-pieces fixed to said supply-pipe over the outlets therein and provided with discharge openings whereby water discharged from said mouth-pieces may flow over the same and fall into the spout, whereby it is carried off.

In testimony whereof I affix my signature, in the presence of two witnesses.

JOSEPH H. BRADY.

Witnesses:
F. G. FISCHER,
E. C. LILLIAN.

Copies of this patent may be obtained for five cents each, by addressing the "Commissioner of Patents, Washington, D. C."